United States Patent

Hegmann

(10) Patent No.: US 12,093,026 B2
(45) Date of Patent: Sep. 17, 2024

(54) COMPREHENSIVE FAULT ANALYSIS OF CONTROL DEVICES AND INDUSTRIAL TECHNICAL INSTALLATIONS

(71) Applicant: Siemens Aktiengesellschaft, Munich (DE)

(72) Inventor: Michael Hegmann, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 694 days.

(21) Appl. No.: 16/973,323

(22) PCT Filed: May 15, 2019

(86) PCT No.: PCT/EP2019/062454
§ 371 (c)(1),
(2) Date: Dec. 8, 2020

(87) PCT Pub. No.: WO2019/238346
PCT Pub. Date: Dec. 19, 2019

(65) Prior Publication Data
US 2021/0247755 A1    Aug. 12, 2021

(30) Foreign Application Priority Data
Jun. 12, 2018    (EP) .................................... 18177172

(51) Int. Cl.
*G05B 23/02*    (2006.01)
*G01M 99/00*    (2011.01)
(Continued)

(52) U.S. Cl.
CPC ....... *G05B 23/0259* (2013.01); *G01M 99/005* (2013.01); *G06F 16/245* (2019.01); *G06F 16/248* (2019.01); *G06N 5/02* (2013.01)

(58) Field of Classification Search
CPC .......................... G05B 23/0259; G06F 16/245
(Continued)

(56) References Cited

U.S. PATENT DOCUMENTS 8,356,207 B2 *   1/2013   Hosek ................... G06F 11/008
                                                            714/48
2003/0046382 A1   3/2003   Nick
(Continued)

FOREIGN PATENT DOCUMENTS

CN          1673909 A       9/2005
CN        101930227 A      12/2010
(Continued)

OTHER PUBLICATIONS

PCT International Search Report and Written Opinion of International Searching Authority mailed Aug. 22, 2019 corresponding to PCT International Application No. PCT/EP2019/062454 filed May 15, 2019.

*Primary Examiner* — Ricky Go
(74) *Attorney, Agent, or Firm* — Henry M. Feiereisen LLC (57) ABSTRACT

A control device of a technical installation receives in normal operation cyclically measurement variables from sensors, and outputs control variables to actuators. In normal operation, the control device stores the history of at least some of the measurement variables at least for a limited time and monitors the measurement variables for the occurrence of a fault. If a fault occurs, the control device transmits a fault message identifying the fault and the history to a knowledge base. In response to the fault message and the histories, the control device receives a reply from the knowledge base and outputs the reply to an operator. Before the normal operation is performed, the control device receives from the operator specifications which allow the control device to defines the histories. In the event of a fault, (Continued)

the control device determines, in dependence on the specifications, which histories to transmit to the knowledge base.

10 Claims, 9 Drawing Sheets

(51) Int. Cl.
*G06F 16/245* (2019.01)
*G06F 16/248* (2019.01)
*G06N 5/02* (2023.01)

(58) Field of Classification Search
USPC .......................................................... 702/184
See application file for complete search history.

(56) References Cited

U.S. PATENT DOCUMENTS

| | | | |
|---|---|---|---|
| 2003/0236649 A1 | 12/2003 | Kodukula et al. | |
| 2005/0060323 A1 | 3/2005 | Leung et al. | |
| 2007/0101178 A1* | 5/2007 | Jammu | G05B 23/0278 714/4.4 |
| 2008/0082302 A1* | 4/2008 | Samardzija | G05B 23/0245 703/2 |
| 2009/0062933 A1 | 3/2009 | Eryurek et al. | |
| 2009/0187303 A1 | 7/2009 | Lehle et al. | |
| 2010/0161141 A1 | 6/2010 | Herre et al. | |
| 2011/0150250 A1 | 6/2011 | Pape et al. | |
| 2011/0178977 A1* | 7/2011 | Drees | H02J 13/00004 706/52 |
| 2012/0084615 A1* | 4/2012 | Ozawa | G06F 11/0793 714/E11.023 |
| 2013/0307799 A1 | 11/2013 | Hauf | |
| 2014/0316743 A1* | 10/2014 | Drees | G05B 15/02 702/183 |
| 2014/0365179 A1 | 12/2014 | Horowitz et al. | |
| 2015/0094846 A1 | 4/2015 | Hamm et al. | |
| 2016/0091397 A1 | 3/2016 | Shinkle et al. | |
| 2017/0031342 A1 | 2/2017 | Tanaka et al. | |
| 2019/0279012 A1* | 9/2019 | Birge | G06V 20/17 |

FOREIGN PATENT DOCUMENTS

| | | |
|---|---|---|
| CN | 102104821 A | 6/2011 |
| CN | 103138327 A | 6/2013 |
| CN | 103425331 A | 12/2013 |
| CN | 102804090 A | 4/2015 |
| CN | 104516309 A | 4/2015 |
| DE | 10233879 A1 | 2/2004 |
| DE | 10 2005 025 520 A1 | 12/2006 |
| DE | 10 2006 056 879 A1 | 6/2008 |

\* cited by examiner

FIG 9

COMPREHENSIVE FAULT ANALYSIS OF CONTROL DEVICES AND INDUSTRIAL TECHNICAL INSTALLATIONS

CROSS-REFERENCES TO RELATED APPLICATIONS

This application is the U.S. National Stage of International Application No. PCT/EP2019/062454, filed May 15, 2019, which designated the United States and has been published as International Publication No. WO 2019/238346 A1 and which claims the priority of European Patent Application, Ser. No. 18177172.6, filed Jun. 12, 2018, pursuant to 35 U.S.C. 119(a)-(d).

BACKGROUND OF THE INVENTION

The present invention is based on an operating method for a control device for controlling an industrial technical installation,
  wherein the control device, in normal operation, receives actual variables of the installation from sensors of the installation in a cyclical manner, utilizes the actual variables of the installation and target variables of the installation to ascertain control variables for actuators of the installation and outputs the control variables to the actuators,
  wherein the control device, in normal operation, at least for some of the actual variables, stores the respective history thereof at least for a limited period of time,
  wherein the control device, in normal operation, monitors the actual variables for the occurrence of a fault.

The present invention is furthermore based on a computer program, which comprises machine code which can be processed by a control device for an industrial technical installation, wherein the processing of the machine code by the control device causes the control device to carry out an operating method of this kind.

The present invention is furthermore based on a control device for an industrial technical installation, wherein the control device is programmed with a computer program of this kind, so that the control device carries out an operating method of this kind.

Faults may occur over the entire lifecycle of industrial technical installations—starting from small installations such as an electrical drive for example, up to large-scale installations such as a chemical installation or a primary industry installation or an installation for manufacturing paper or cement, for example. Faults of this kind—depending on the fault—may be associated with limitations during operation of the industrial technical installation or a standstill of the industrial technical installation. Every effort is therefore made to rectify faults of this kind as quickly as possible and to the fullest possible extent once they have occurred. For this purpose, it is generally necessary to describe the fault as accurately as possible. The more accurate the description of the fault, the more precisely it is possible to determine the measures for rectifying the fault.

In the prior art, the operator of the industrial technical installation is generally shown generically formulated fault messages with a corresponding fault code, supplemented with accompanying values if necessary, via a display device. These messages convey no, one or more possibilities for rectifying the fault to the operator of the industrial technical installation, depending on the situation of the individual case.

It is furthermore known, in the event of a fault, additionally also to record measurement values of some less-important signals, which have arisen immediately before the occurrence of the fault. Sometimes, it is also possible to record a history of signals of this kind. The faults and the signals are then able to be displayed to an operator for the industrial technical installation via a display device.

What is common among all measures of the prior art is that only the fault is displayed, but no measures for rectifying the fault beyond this as such are proposed via the display of the fault.

Known from US 2016/0 091 397 A1 is an operating method for a control device for controlling an industrial technical installation, wherein the control device, in normal operation, receives actual variables of the installation from sensors of the installation in a cyclical manner, utilizes the actual variables of the installation and target variables of the installation to ascertain control variables for actuators of the installation and outputs the control variables to the actuators, wherein the control device, in normal operation, monitors the actual variables for the occurrence of a fault. Furthermore, the control device receives a response from the knowledge base as a reaction to a fault which has occurred. The control device is able to output the response to an operator of the control device via a display device.

Known from US 2009/0 062 933 A1 is an operating method for a control device for controlling an industrial technical installation, wherein the control device, in normal operation, receives actual variables of the installation from sensors of the installation in a cyclical manner, utilizes the actual variables of the installation and target variables of the installation to ascertain control variables for actuators of the installation and outputs the control variables to the actuators, wherein the control device, in normal operation, stores a history of at least some of the actual variables, at least for a limited period of time, wherein the control device, in normal operation, monitors the actual variables for the occurrence of a fault, wherein the control device, on occurrence of a fault, stores a fault message which identifies the fault and, at least for some of the actual variables, whose history is stored by the control device, transmits the history to a knowledge base operated on an automated basis.

Known from DE 10 2005 025 520 A1 is an operating method for a control device for controlling an industrial technical installation, wherein the control device, in normal operation, receives actual variables of the installation from sensors of the installation in a cyclical manner, utilizes the actual variables of the installation and target variables of the installation to ascertain control variables for actuators of the installation and outputs the control variables to the actuators, wherein the control device, in normal operation, stores a history of at least some of the actual variables, at least for a limited period of time, wherein the control device, in normal operation, monitors the actual variables for the occurrence of a fault, wherein the control device, on occurrence of a fault, stores a fault message which identifies the fault and, at least for some of the actual variables, whose history is stored by the control device, transmits the history to a knowledge base operated on an automated basis.

The object of the present invention consists in creating improved possibilities, by means of which, in addition to the fault message as such, directions for rectifying the fault can also be given to the operator of the industrial technical installation.

SUMMARY OF THE INVENTION

The object is achieved by an operating method as set forth hereinafter. Advantageous embodiments of the operating method are the subject matter of dependent claims.

According to the invention, an operating method of the kind mentioned in the introduction is embodied such that

- the control device, on occurrence of a fault, transmits a fault message which identifies the fault and, at least for some of the actual variables, whose respective history is stored by the control device, the respective history to a knowledge base operated on an automated basis,
- the control device, as a reaction to the transmission of the fault message and the transmitted histories, receives a response from the knowledge base,
- the control device outputs the response to an operator of the control device via a display device, and
- the control device, before carrying out the normal operation, receives specifications from the operator and during normal operation, as a function of the specifications, determines which histories it ascertains, and/or on occurrence of a fault, as a function of the specifications, determines which histories it transmits to the knowledge base on occurrence of a fault.

By way of this approach, it is possible to give the operator of the control device targeted directions for rectifying the fault by means of the response, wherein it is simultaneously possible, in a simple and efficient manner, for the operator to stipulate which information is acquired and which information is transmitted to the knowledge base in the event of a fault.

In a preferred embodiment of the operating method, provision is made

- for the control device, in normal operation, for the limited period of time, in addition to the histories for at least some of the actual variables, to also store a respective history for at least some of the target variables and/or for at least some of the control variables and
- for the control device, on occurrence of the fault, in addition to the fault message and the transmitted histories of the actual variables, to also transmit the respective history to the knowledge base at least for some of the target variables and/or control variables, whose respective history is stored by the control device.

As a result, more information is made available to the knowledge base, meaning that the knowledge base is able to "tailor" its response more precisely to the fault which has occurred.

Preferably, the control device determines which histories it transmits to the knowledge base as a function of the fault which has occurred. As a result, it is possible to reduce the information transmitted to the knowledge base to what is essential.

Preferably, on occurrence of a fault, in addition to the fault message and the transmitted histories, the control device transmits further information to the knowledge base. A yet further improved "tailoring" of the response by way of the knowledge base is possible as a result.

The further information may in particular comprise at least one of the following matters:

- identification data for uniquely identifying the control device and/or the installation,
- information regarding the hardware of the control device and/or the installation,
- information regarding the firmware of the control device and/or the installation,
- information regarding the software of the control device,
- communication settings of the control device,
- settings of control parameters of the control device,
- information regarding the status of the environment of the control device and/or the installation,
- information regarding wear to elements of the installation which has occurred,
- a configuration of the installation.

Preferably, as a reaction to the response output to the operator via the display device, the control device receives supplementary information from the operator and forwards the supplementary information to the knowledge base. As a result, the knowledge base is able to optimize its future behavior.

The optimization of the future behavior of the knowledge base is particularly efficient if the supplementary information contains a selection of one of a plurality of partial responses contained in the response, an assessment of the response and/or free text. The selection of a partial response may mean, for example, that the response has a plurality of possible measures for rectifying the fault contained therein and the operator marks which measures they have taken or which measure has actually lead to success. The assessment of the response may, for example, be an assessment on a scale from 0 or 1 ("very bad") to 5 or 10 ("excellent").

On occurrence of a fault, the control device may either maintain normal operation despite the fault, or terminate normal operation due to the fault, during which normal operation it receives the actual variables of the installation from the sensors of the installation in a cyclical manner, utilizes the actual variables of the installation and the target variables of the installation to ascertain the control variables for the actuators of the installation and outputs the control variables to the actuators. Which of these two measures is taken may depend on the fault.

The knowledge base may be stored within the control device. Alternatively, the knowledge base may be stored in a computer which is different from the control device. In this case, the computer is connected to the control device via a computer network.

In a particularly advanced embodiment of the operating method, it is possible for the control device to autonomously ascertain measures for rectifying the fault on the basis of the response. In particular, the response may contain a plurality of possible measures for rectifying the fault, and additionally conditions regarding which measures are expedient under which circumstances in the context of rectifying the fault. In this case, the control device may for example evaluate further histories which have been acquired, but not transmitted to the knowledge base, and depending upon the evaluation ascertain the one or the other proposed measure.

In the event of independently ascertaining measures for rectifying the fault, it is possible for the control device to carry out the ascertained measures directly. Depending on the situation of the individual case—for example the kind of fault and/or the kind of measure ascertained—this may alternatively take place with or without prior confirmation of the measure by the operator.

The object is furthermore achieved by a computer program as set forth hereinafter. According to the invention, the processing of the machine code by the control device causes the control device to carry out an operating method according to the invention.

The object is furthermore achieved according to the invention by a control device which is programmed with a computer program according to the invention, so that the processing of the machine code by the control device causes the control device to carry out an operating method according to the invention.

BRIEF DESCRIPTION OF THE DRAWING

The above-described properties, features and advantages of this invention and the manner in which they are achieved are made more clearly and distinctly intelligible in conjunction with the following description of the exemplary embodiments which are described in greater detail in conjunction with the drawings, in which, in a schematic representation.

DETAILED DESCRIPTION OF PREFERRED EMBODIMENTS

Figure 1:
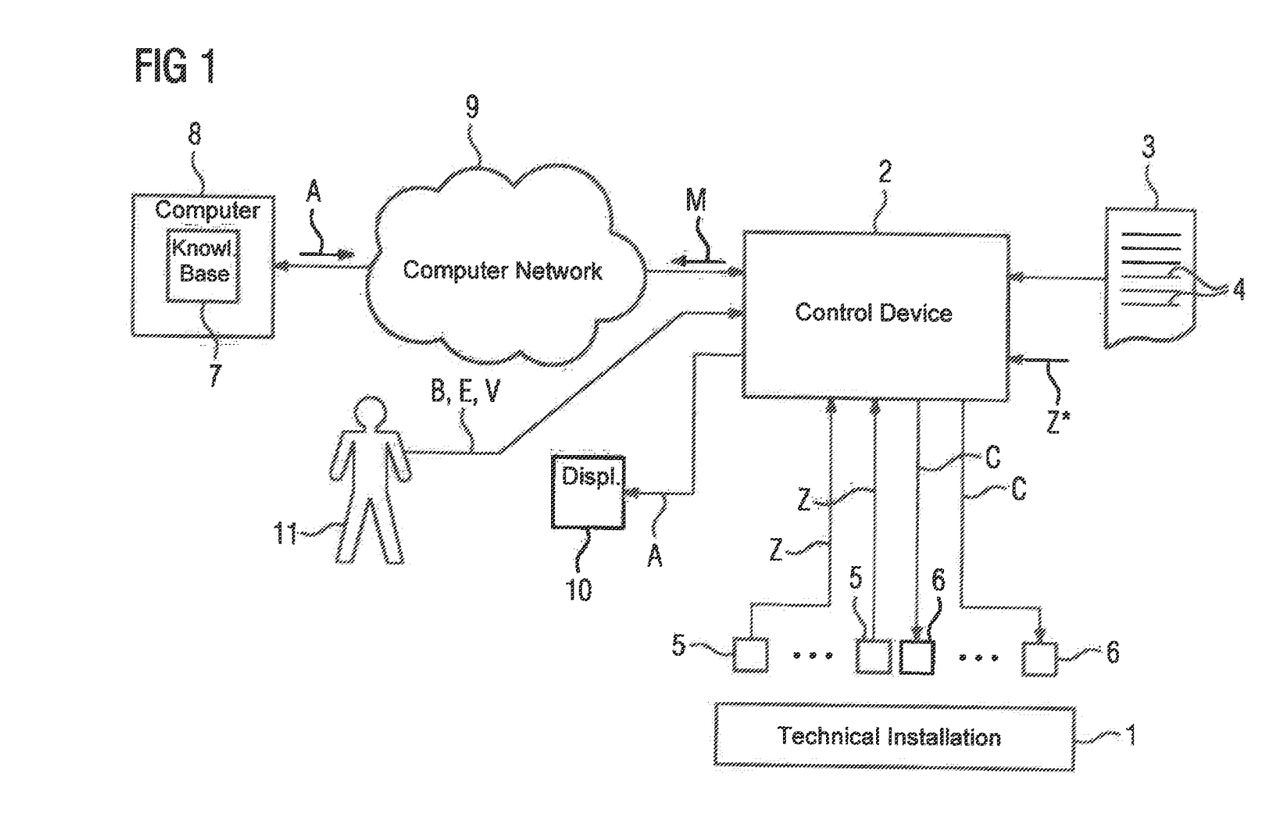
FIG. 1 shows a networked industrial technical installation.

According to FIG. 1, an industrial technical installation 1 is controlled by a control device 2. The industrial technical installation 1 may involve a larger installation, for example a paper industry installation, a chemical industry installation or a primary industry installation, in particular a rolling mill. Alternatively, the industrial technical installation 1 may involve a medium-sized installation, for example a machine tool or an injection molding machine. In another alternative, the industrial technical installation 1 may involve a smaller installation, for example an individual drive of a larger machine or installation.

As a rule, the control device 2 is a software-programmable control device. It is therefore programmed with a computer program 3. The computer program 3 comprises machine code 4 which can be processed by the control device 2. The processing of the machine code 4 by the control device 2 causes the control device 2 to carry out an operating method which is explained in greater detail below in conjunction with the further FIG.

Figure 2:
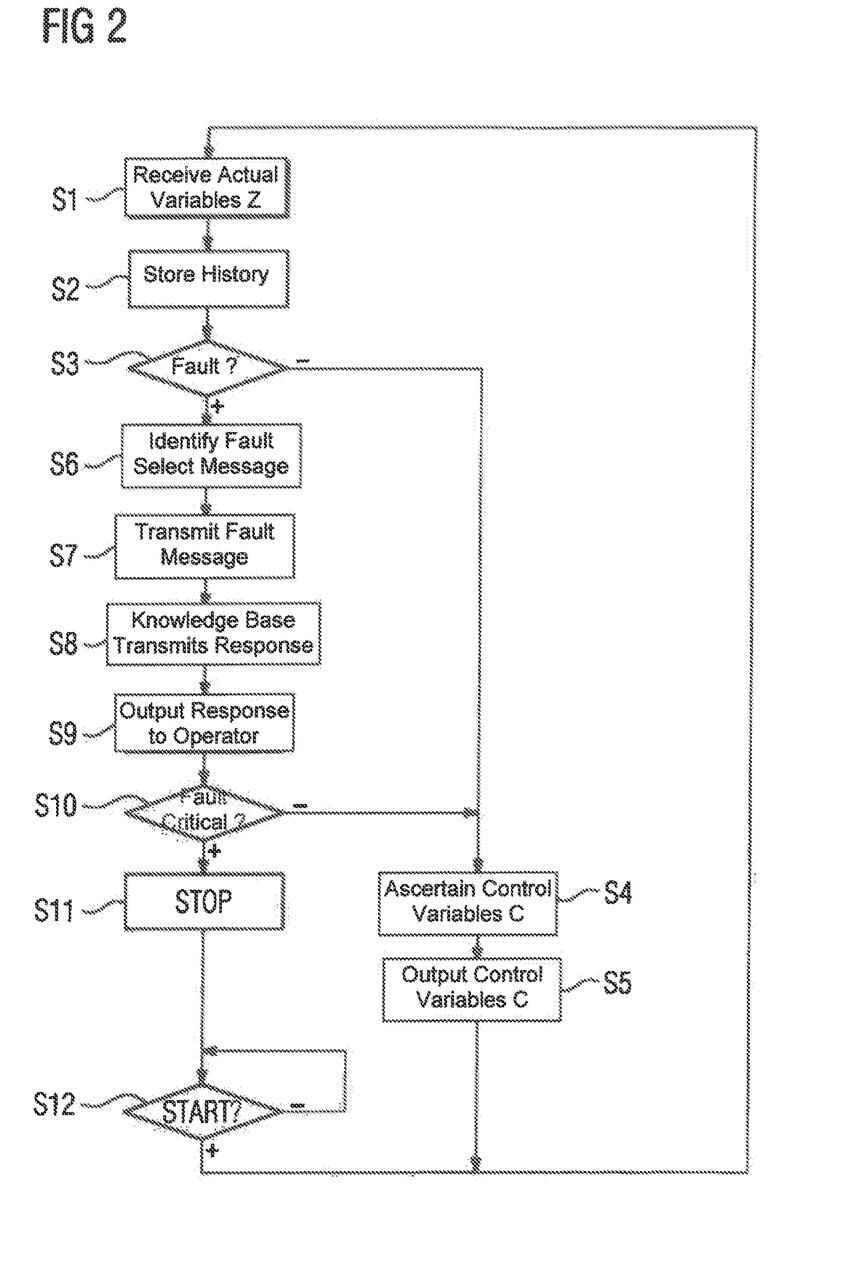
FIG. 2 shows a flow diagram.

In order to control the installation 1, in the context of the operating method, in normal operation, the control device 2 receives actual variables Z from sensors 5 of the installation 1 (in the case of a drive, from a position sensor for example) in a step S1. Purely by way of example, it is assumed in the following that a total of 10 actual variables Z are acquired. Of course, however, it is also possible to acquire a different number of actual variables Z. The actual variables Z are referred to with Z0 to Z9 in the following, where a distinction is to be made between different actual variables Z. If reference is made to the actual variables Z in general, however, then only the reference character Z is used.

In a step S2, the control device 2 stores a history of at least some of the actual variables Z, at least for a limited period of time. For example, the histories may be stored for the actual variables Z1, Z2, Z7 and Z8, while this does not take place for the actual variables Z0, Z3 to Z6 and Z9. As a result, the control device 2 therefore does not gradually fill a cache memory, in which n temporally successive values of the respective actual variable Z are saved, for each actual variable Z whose history it stores. If the cache memory is full, then the oldest value of the respective actual variable Z is superseded in each case. The number n of values defines the limited period of time in conjunction with a cycle time, with which the steps S1 and S2 as well as further steps S3 to S5 are repeated.

In step S3, the control device 3 monitors the actual variables Z for the occurrence of a fault. For example, for this purpose the control device 3 may compare one or more of the acquired actual variables Z, or variables derived from the actual variables Z, with limit values and depending on whether the respective limit value has been exceeded or has not been reached, may identify a fault or no fault.

If the control device 2 does not identify a fault in step S3, then the control device 2 proceeds to step S4. In step S4, the control device 2 ascertains control variables C for actuators 6 of the installation 1 (in the case of a drive, a target current or actuation statuses for a current converter, for example). In the context of ascertaining the control variables C, the control device 2 at least utilizes the actual variables Z of the installation 1 and corresponding target variables Z*. In some cases, the control device 2 additionally utilizes internal changing variables (for example statuses of timers and flags) and/or internal parameters which are constant during normal operation (for example the settings of regulators). Purely by way of example, it is assumed in the following that a total of 10 target variables Z* are specified. Of course, however, a different number of target variables Z* is also possible. The target variables Z* are referred to with Z0* to Z9* in the following, where a distinction is to be made between different target variables Z*. If reference is made to the target variables Z* in general, however, then only the reference character Z* is used. Similar statements apply for the control variables C.

In step S5, the control device 2 outputs the ascertained control variables C to the actuators 6. The control device 2 then returns to step S1.

The control device 2 thus carries out the steps S1 to S5 cyclically, provided that no fault is present. The cycle time, with which the sequence of steps S1 to S5 is repeated, generally lies in the lower millisecond range, in some cases even lower. In some cases—particularly in drives—a cycle time of below 100 us is even possible.

If the control device 2 identifies a fault in step S3, however, then the control device 2 proceeds to a step S6. In step S6, the control device 2 ascertains which fault has occurred, and selects a fault message M which identifies this fault. Furthermore, in step S6, at least for some of the actual variables Z, whose history it stores, it assigns the respective history thereof to the fault message M. If, according to the above example, the histories for the actual variables Z1, Z2, Z7 and Z8 are acquired, then the control device 2 may for example assign the histories for the actual variables Z1 and Z7 to the fault message M, whereas it does not assign the histories for the actual variables Z2 and Z8 to the fault message M.

In a step S7, the control device 2 then transmits the fault message M and the histories assigned to the fault message M to a knowledge base 7 operated on an automated basis. It is possible for the knowledge base 7 to be stored within the control device 2 itself. Generally, however, the knowledge base 7 is stored in a computer 8 according to the representation in FIG. 1. In this case, the computer 8 is a device which is different from the control device 2. It is connected to the control device 2 via a computer network 9—for example the Internet or a LAN. The computer 8 may be cloud-based, for example.

An automated analysis and evaluation of the fault which has occurred takes place in the knowledge base 7. For this purpose, the knowledge base 7 evaluates the histories of the transmitted actual variables Z in particular. For example, the transmitted histories may be stored associated with the fault message M or without being associated therewith, may be linked to one another and also may be analyzed. Furthermore, comparable matters may also be evaluated, which have occurred at comparable control devices 2 and/or comparable installations 1.

As a reaction to the transmitted fault message M, the knowledge base 7 then transmits a corresponding response A to the control device 2. This receives the response A in a step S8. In a step S9, the control device 2 outputs the response A to an operator 11 (see FIG. 1) of the control device 2 via a display device 10 (see also FIG. 1). The response A can be embodied as required. For example, according to the representation in FIG. 3, the response A may comprise one or more partial responses A1 to A4.

In a step S10, the control device 2 checks whether the fault which has occurred and has been reported is of a critical nature. If this is not the case, the control device 2 proceeds to step S4. In this case, the control device therefore continues to carry out steps S1 to S5. It therefore maintains normal operation despite the fault. If the control device 2 identifies a critical fault in step S10, however, then it proceeds to a step S11. In step S11, the control device 2 terminates normal operation. It only resumes normal operation when the operator 11 of the control device 2 specifies a command for resuming normal operation in a step S12.

Technically speaking, the representation according to FIG. 2 is not entirely correct. This is because, technically speaking, step S10 follows immediately after step S3. Steps S6 to S9, by contrast, are either carried out in parallel with steps S1 to S5 in the event of a fault or are arranged after step S11. The representation according to FIG. 2, however, leads to a more understandable representation.

The approach described may be modified in various ways.

Figure 4:
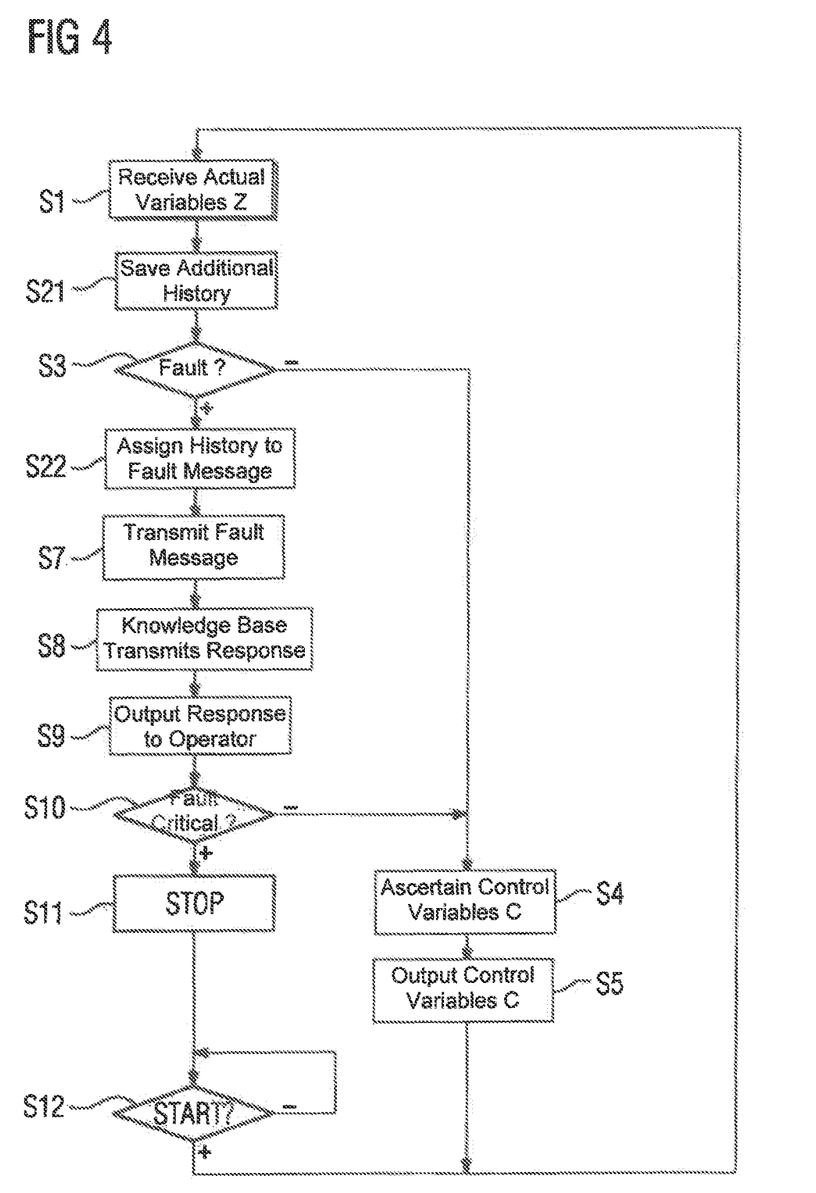
FIGS. 4 to 9 show flow diagrams.

It is therefore possible, for example, according to the representation in FIG. 4, for step S2 to be replaced by a step S21 and for step S6 to be replaced by a step S22.

In this case, in step S21, for the limited period of time, the control device 2 may additionally also save a corresponding history for at least some of the target variables Z* and/or some of the control variables C. For example, in step S21, the control device may additionally store the history for the target variables Z0*, Z1* and Z8* and/or the control variables C3, C5 and C7 in each case. This corresponds with the control device 2 being able to assign a respectively acquired history, not only for at least some of the actual variables Z, but also for at least some of the target variables Z* and/or at least some of the control variables C, to the fault message M in step S22. If, according to the above example—in addition to the histories for the actual variables Z—the history for the target variables Z0*, Z1* and Z8* and/or the control variables C3, C5 and C7 is stored in each case, then the control device 2—in addition to the histories for the actual variables Z1 and Z7—may for example assign the history for the target variables Z0* and Z8* and/or the history for the control variable C3 to the fault message M in step S22. In any case, the assigned histories are transmitted to the knowledge base 7 together with the fault message M. This applies regardless of whether histories for actual variables Z, target variables Z* or control variables C are involved.

Figure 5:
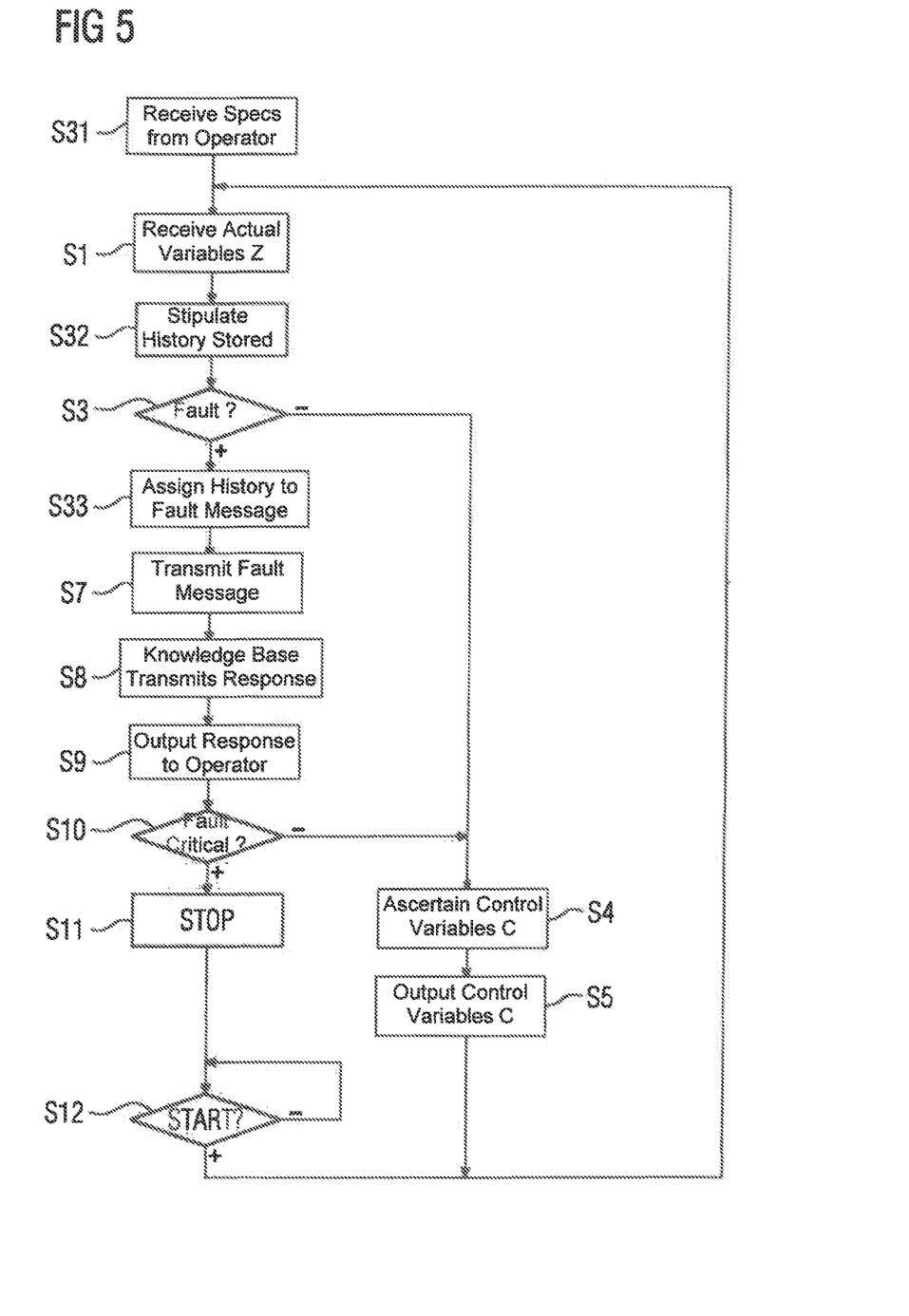

Furthermore, according to the invention and according to the representation in FIG. 5, an additional step S31 is present and steps S2 and S6 are additionally replaced by steps S32 and S33. In step S31, the control device therefore receives specifications V from the operator 11. The specifications V stipulate which histories are stored in step S32. Alternatively or additionally, the specifications V stipulate which histories are assigned to the fault message M in the event of a fault in step S33. As a function of the specifications V, the control device 2 therefore determines which histories it ascertains and/or which histories it transmits to the knowledge base 7 on occurrence of a fault. As required, the approach in FIG. 5 may be combined with the approach in FIG. 4, or may be implemented independently therefrom.

Figure 6:
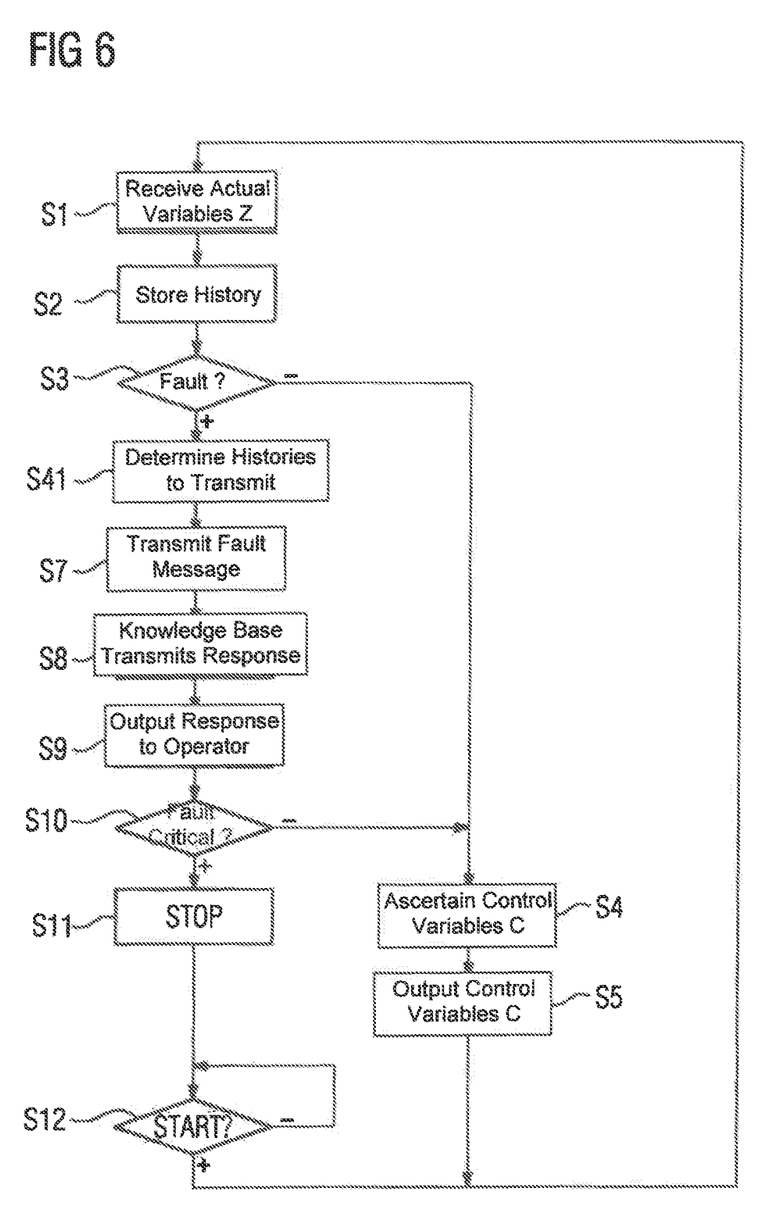

Furthermore, it is possible according to the representation in FIG. 6 for step S6 to be replaced by a step S41. In this case, the control device 2 determines which histories it transmits to the knowledge base 7 as a function of the fault which has occurred. As required, the approach in FIG. 6 may be combined with the approach in FIG. 4 and/or in FIG. 5, or may be implemented independently therefrom.

Figure 7:
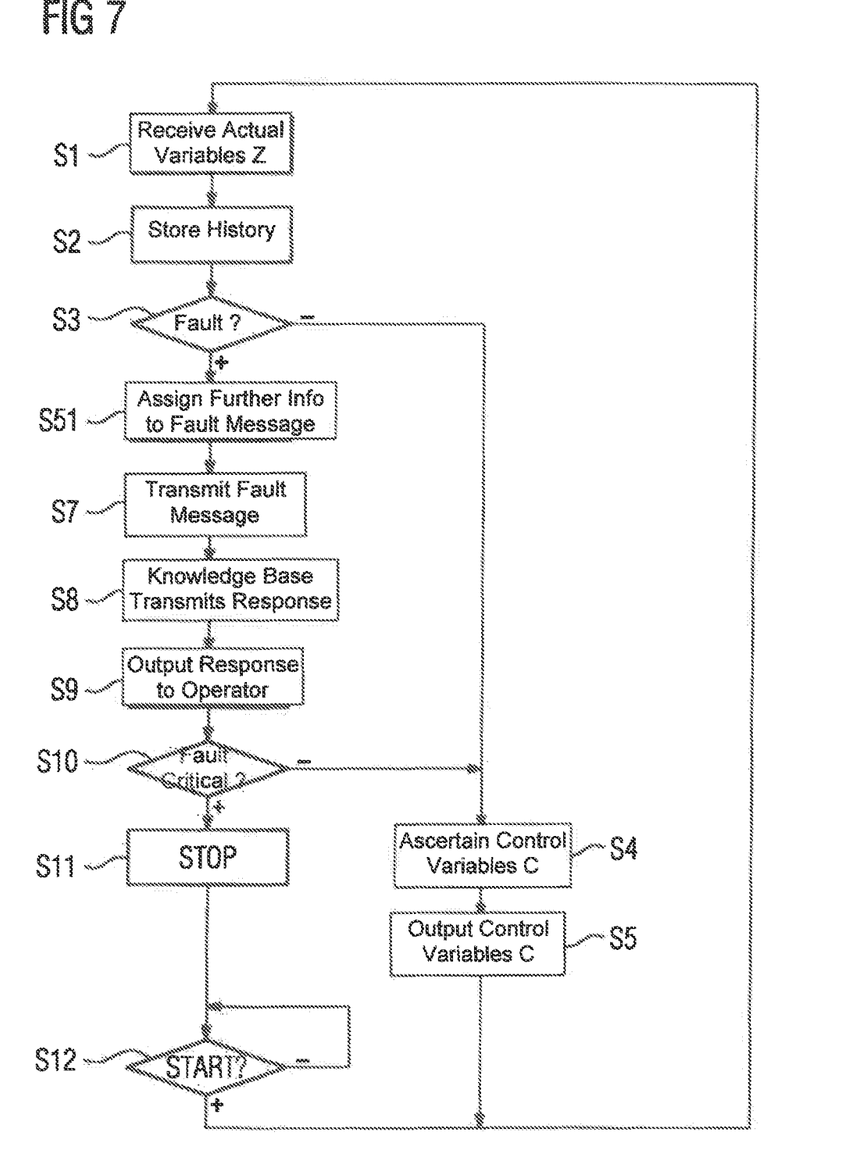

Furthermore, it is possible according to the representation in FIG. 7 for step S6 to be replaced by a step S51. In this case, the control device 2 assigns further information I to the fault message M. The information I is also transmitted to the knowledge base 7 together with the fault message M as such in step S7. As required, the approach in FIG. 7 likewise may be combined with the approach in one or more of FIGS. 4 to 6, or may be implemented independently therefrom.

The additional information I may be determined as required. For example, the additional information I may involve at least one of the following details:

Identification data for uniquely identifying the control device 2 and/or the installation 1. In this context, depending on requirements, an identification of the respective type (for example "drive of type XYZ") or an identification of the individual control device 2 or the individual installation 1 (for example "drive 4 of the machine XY", which was delivered to the company Müller on Dec. 4, 2015") may take place.

Information regarding the hardware of the control device 2 and/or the installation 1. For example, the details may comprise order numbers, version numbers, etc.

Information regarding the firmware of the control device 2 and/or the installation 1. For example, information may be delivered regarding which firmware modules are installed in general or are used, as well as which version of particular firmware modules or of the firmware overall is used.

Information regarding the software of the control device 2. Here too—similarly to the information regarding the firmware of the control device 2—information may be delivered regarding which software modules are installed in general or are used, as well as which version of particular software modules or of the software overall is used.

Communication settings of the control device 2, for example the networking thereof with other control devices and/or higher-level computers and so forth.

Settings of control parameters of the control device 2, for example parameterizations of regulators.

Information regarding the status of the environment of the control device 2 and/or the installation 1, for example temperature and/or atmospheric humidity.

Information regarding wear to elements of the installation 1 which has occurred. Purely by way of example, in the case of an electrical drive with carbon brushes, this may be the cumulative wear to the carbon brushes, or in the case of an electromechanical switch (contactor) or an electronic switch (IGBT, MOSFET) the number of switching cycles.

A configuration of the installation 1, for example at which point of a larger machine a particular drive is used.

Figure 8:
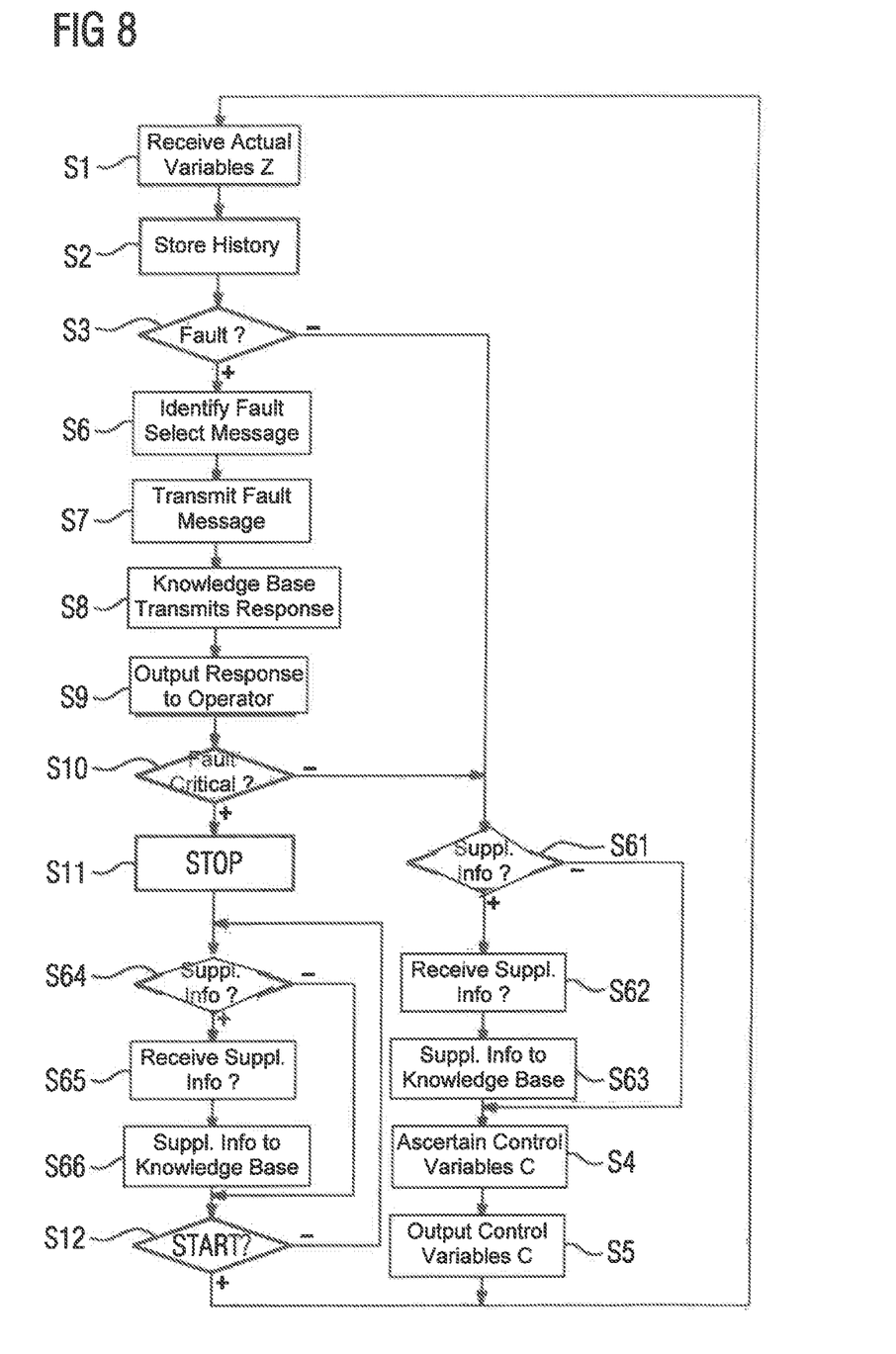

Furthermore, according to the representation in FIG. 8, it is possible for additional steps S61 to S66 to be present. In step S61, the control device 2 checks whether the operator 11 is specifying their supplementary information E. If this is the case, then the control device 2 receives the supplementary information E in step S62. In step S63, the control device 2 forwards the supplementary information E to the knowledge base 7. As the control device 2 carries out steps S61 to S63 in the NO branch of step S10 and therefore after steps S8 and S9, these steps are carried out by the control device 2 as a reaction to the response A. Steps S64 to S66 correspond to steps S61 to S63. However, they are carried out in the YES branch of step S10. As required, the approach in FIG. 8 likewise may be combined with the approach in one or more of FIGS. 4 to 7, or may be implemented independently therefrom.

Technically speaking, the representation according to FIG. 8 is also not entirely correct. This is because, technically speaking, steps S61 to S63—similarly to steps S6 to S9—are carried out in parallel with steps S1 to S5. In the case of steps S64 to s66, it is likewise possible to carry them out in the background.

Figure 3:
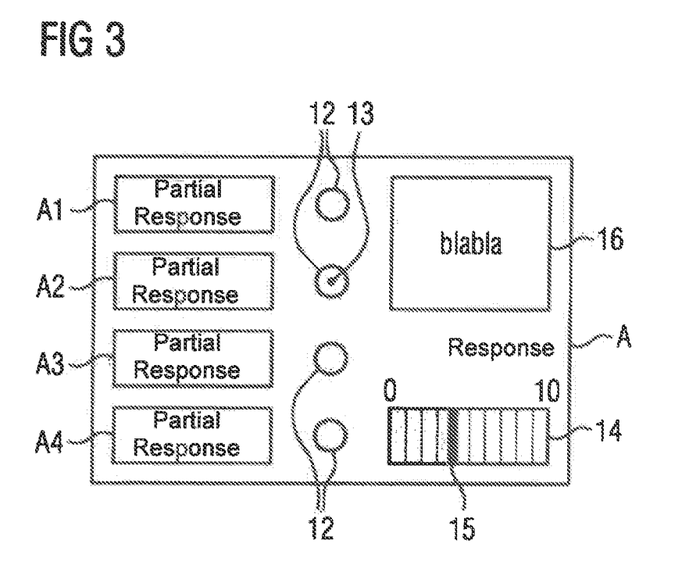
FIG. 3 shows a possible response.

For example, the supplementary information E may contain a selection of one of the partial responses A1 to A4, as indicated by four circles 12 in the representation in FIG. 3, of which only one is filled with a point 13. Alternatively or additionally, the supplementary information E may contain an assessment of the response A, as indicated by an assessment field 14 with a movable marking 15 in the representation in FIG. 3. Alternatively or additionally, the response A may also contain a text field 16, into which the operator 11 is able to enter free text.

Figure 9:
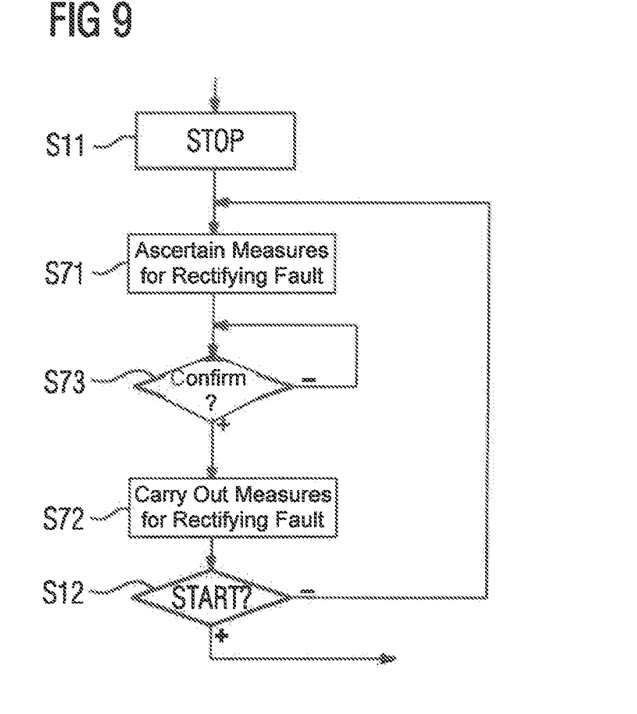

In those cases in which normal operation is terminated due to the fault, according to the representation in FIG. 9 it is furthermore possible for steps S71 and S72 to follow step S11. In step S71, the control device 2 autonomously ascertains measures for rectifying the fault on the basis of the response A. In step S72, the control device 2 carries out the measures ascertained in step S71. Where necessary, in a step S73 a confirmation B may additionally be requested from the operator 11 before carrying out the ascertained measures. If this is the case, the control device 2 only carries out step S72 once the confirmation B has been specified. As required, the approach in FIG. 9 likewise may be combined with the approach in one or more of FIGS. 4 to 8, or may be implemented independently therefrom.

The present invention has many advantages. In particular, it is often the case that considerably improved directions for rectifying faults are given to the operator 11 than in the prior art. Standstill periods can be reduced as a result. It is furthermore possible to use less qualified personnel. Due to the evaluation in a central knowledge base 7, it is furthermore possible to gradually continue expanding the knowledge base 7. If necessary, it may also be possible to give directions to the operator 11 before faults even occur, by means of which the fault can be avoided. By way of the supplementary information E, it is possible to optimize the knowledge base 7 even further. By analyzing the gathered data, it is possible in particular for systematic faults to be identified in the knowledge base 7, which are then able to be taken into consideration for subsequent product improvements. Furthermore, it is possible to log all faults and the rectification thereof in the central knowledge base 7, so that a history of the control device 2 or of the installation 1 can be compiled in a simple manner. The communication between the control device 2 and the computer 8 may take place in an anonymous or identified manner, as well as in an encrypted or unencrypted manner, as required. It is also possible for a communication in one or in both directions to take place only after a prior authentication and authorization.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. A method for operating a control device controlling an industrial technical installation by executing machine code, said method comprising:
   before operating in a normal operation, receiving specifications from an operator and determining with the control device, as a function of the specifications, histories of actual variables of the installation,
   in normal operation:
      cyclically receiving from sensors of the installation the actual variables of the installation,
      determining control variables for actuators of the installation by utilizing the actual variables and target variables of the installation, and outputting the control variables to the actuators,
      storing a history of at least some of the actual variables and a respective history for at least some of the target variables or for at least some of the control variables, or both, for a limited period of time,
      monitoring the actual variables for an occurrence of a fault,
   on occurrence of a fault, transmitting by the control device a fault message which identifies the fault and transmitting by the control device, for some of the actual variables and for some of the target variables or control variables, having a respective history stored by the control device, the respective history to an automated knowledge base based on the executed machine code,
   receiving a response from the knowledge base in response to the transmission of the fault message and the transmitted respective history,
   outputting a response to the operator via a display device, and
   autonomously ascertaining measures for rectifying the fault on the basis of the response.

2. The method of claim 1, wherein on occurrence of a fault, the processing of the machine code by the control device causes the control device, to transmit in addition to the fault message and the transmitted histories further information to the knowledge base.

3. The method as claimed in claim 2, wherein the further information comprises at least one of the following:
   identification data for uniquely identifying the control device and/or the installation,
   information regarding the hardware of the control device and/or the installation,
   information regarding the firmware of the control device and/or the installation,
   information regarding the software of the control device,
   communication settings of the control device,
   settings of control parameters of the control device,
   information regarding the status of the environment of the control device and/or the installation,
   information regarding wear to elements of the installation which has occurred, and
   a configuration of the installation.

4. The method of claim 1, wherein the processing of the machine code by the control device causes the control device, as a reaction to the response outputted to the operator via the display device, to receive supplementary information from the operator and to forward the supplementary information to the knowledge base.

5. The method of claim 4, wherein the supplementary information comprises selected partial responses contained in the response, an assessment of the response or free text.

6. The method of claim 1, wherein the processing of the machine code by the control device causes the control device either to terminate normal operation due to the fault or to maintain normal operation despite the fault, depending on a criticality of the fault, wherein the control device cyclically receives during normal operation the actual variables of the installation from the sensors of the installation, utilizes the received actual variables of the installation and the target variables of the installation to ascertain the control variables for the actuators of the installation, and outputs the control variables to the actuators.

7. The method of claim 1, wherein the knowledge base is stored in the control device or in a computer that is different from the control device and that is connected to the control device via a computer network.

8. The method of claim 1, wherein the processing of the machine code by the control device causes the control device to carry out the ascertained measures with or without prior confirmation by the operator.

9. A computer program embodied in a computer-readable non-transitory medium and comprising program code, which when read into a memory of a control device and executed as machine code by the control device, causes the control device to:
   before operating in a normal operation, receive specifications from an operator and determine, as a function of the specifications, histories of actual variables of the installation,
   in normal operation:
      cyclically receive from sensors of the installation the actual variables of the installation,
      determine control variables for actuators of the installation by utilizing the actual variables and target variables of the installation, and output the control variables to the actuators,
      store a history of at least some of the actual variables and a respective history for at least some of the target variables or for at least some of the control variables or both, at least for a limited period of time,
      monitor the actual variables for an occurrence of a fault,
   on occurrence of a fault, transmit by the control device a fault message which identifies the fault and transmit by the control device, for some of the actual variables and for some of the target variables or control variables having a respective history stored by the control device, the respective history to an automated knowledge base based on the executed machine code,
   receive a response from the knowledge base in response to the transmission of the fault message and the transmitted respective history,
   output a response to the operator via a display device, and
   autonomously ascertain measures for rectifying the fault on the basis of the response.

10. An industrial technical installation, comprising:
a plurality of sensors providing actual variables of the installation,
a plurality of actuators responsive to control signals, and
a control device controlling the industrial technical installation by executing machine code, the control device configured to
   before operating the installation in a normal operation, receive specifications from an operator and determine, as a function of the specifications, histories of the actual variables of the installation,
   in normal operation:
      cyclically receive from the sensors of the installation the actual variables of the installation,
      determine the control variables for the actuators of the installation by utilizing the actual variables and target variables of the installation, and
      output the control variables to the actuators,
      store a history of at least some of the actual variables and a respective history for at least some of the target variables or for at least some of the control variables, or both, at least for a limited period of time,
      monitor the actual variables for an occurrence of a fault,
   on occurrence of a fault, transmit by the control device a fault message which identifies the fault and transmit by the control device, for some of the actual variables and for some of the target variables or control variables having a respective history stored by the control device, the respective history to an automated knowledge base based on the executed machine code,
   receive a response from the knowledge base in response to the transmission of the fault message and the transmitted respective history,
   output a response to the operator via a display device, and
   autonomously ascertain measures for rectifying the fault on the basis of the response.

* * * * *